US012789282B2

(12) United States Patent
VandeCorput et al.

(10) Patent No.: US 12,789,282 B2
(45) Date of Patent: Nov. 10, 2026

(54) METHODS AND SYSTEMS FOR LIQUID DIVERSION FOR A WELDING DEVICE

(71) Applicant: Illinois Tool Works Inc., Glenview, IL (US)

(72) Inventors: Logan Matthew VandeCorput, Freedom, WI (US); Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1060 days.

(21) Appl. No.: 17/895,666

(22) Filed: Aug. 25, 2022

(65) Prior Publication Data

US 2023/0063226 A1 Mar. 2, 2023

Related U.S. Application Data

(60) Provisional application No. 63/237,270, filed on Aug. 26, 2021.

(51) Int. Cl.
*B23K 9/32* (2006.01)
*B23K 9/10* (2006.01)
*B23K 9/12* (2006.01)

(52) U.S. Cl.
CPC ............ *B23K 9/321* (2013.01); *B23K 9/1043* (2013.01); *B23K 9/125* (2013.01)

(58) Field of Classification Search
CPC ....... B23K 9/321; B23K 9/1043; B23K 9/125
USPC .......................................................... 219/105
See application file for complete search history.

(56) References Cited

U.S. PATENT DOCUMENTS

| | | | | |
|---|---|---|---|---|
| 4,102,466 A | | 7/1978 | Jadatz | |
| 4,265,365 A | * | 5/1981 | Boteler | H02G 3/088 174/53 |
| 4,973,797 A | * | 11/1990 | Jorgensen | H02G 3/088 174/53 |
| 4,994,631 A | * | 2/1991 | Williams, Jr. | H02G 3/14 174/67 |
| 5,239,129 A | * | 8/1993 | Ehrenfels | H02G 3/14 361/641 |

OTHER PUBLICATIONS

Canadian Examiner Requisiton Appln No. 3,171,514 dated Nov. 3, 2023.

* cited by examiner

*Primary Examiner* — Elizabeth M Kerr
*Assistant Examiner* — Alba T Rosario-Aponte
(74) *Attorney, Agent, or Firm* — McAndrews Held & Malloy, Ltd.

(57) ABSTRACT

An example liquid diversion system for a welding device incorporating one or more geometric features in a receptacle cover, employing a hinge cover (e.g., a surface mounted bezel), and/or a liquid diverter behind the hinge cover is provided. For example, the disclosed liquid diversion system employs receptacle covers having one or more sloped surfaces, a hinge cover with an indentation, and a liquid diverter with a sloped extension, each configured to divert flowing liquid away from the welding device.

10 Claims, 8 Drawing Sheets

METHODS AND SYSTEMS FOR LIQUID DIVERSION FOR A WELDING DEVICE

CROSS-REFERENCE TO RELATED APPLICATIONS

This application hereby claims priority to and the benefit of U.S. Provisional Application Ser. No. 63/237,270, entitled "Methods And Systems For Liquid Diversion For A Welding Device," filed Aug. 26, 2021. The above listed U.S. Applications is hereby incorporated by reference in its entireties for all purposes.

BACKGROUND

A common industry problem for welder/generator systems is the potential for water to breach the external housing and seep into the electrical receptacles and other external connections. Water can cause rust on contacts and/or damage electrical circuitry or components, degrading system performance, increasing requirements for maintenance, and/or reducing the useful life of the system. Conventionally, after-market covers have been added over exposed electrical receptacles. However, such covers are large, expensive, extend out from the external housing (even when the receptacle is not in use), and a particular system may require multiple such covers which may or may not be able to accommodate the large cover size. A system that mitigates water ingress for welding device receptacles without the need for additional, expensive parts is therefore desirable.

SUMMARY

Systems and methods are disclosed of a liquid diversion system for a welding device incorporating one or more geometric features in a cover, employing a hinge cover (e.g., a surface mounted bezel), and/or a liquid diverter behind the hinge cover is provided, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
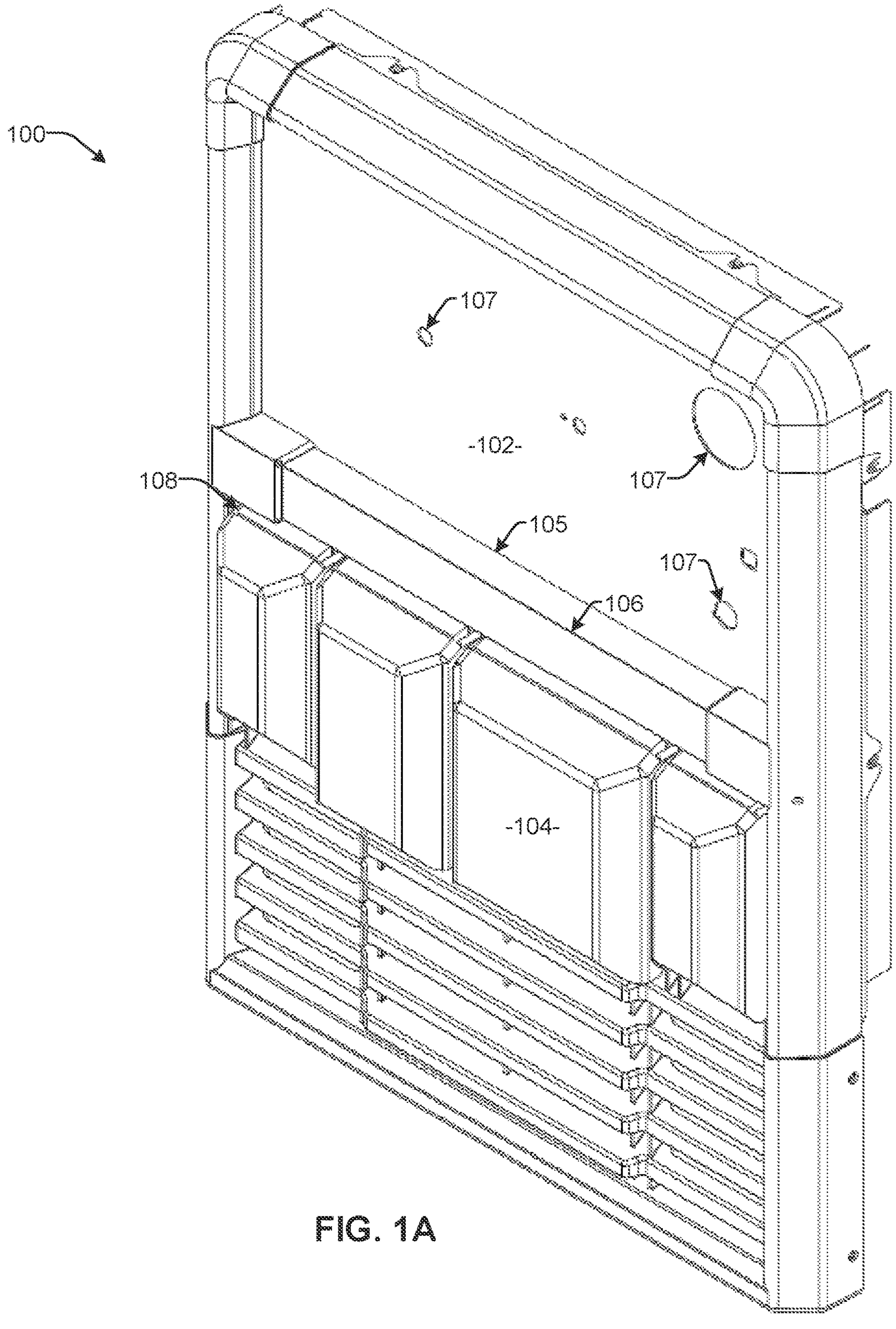
FIG. 1A illustrates a perspective view of an example enclosure panel employing a liquid diversion system, in accordance with aspects of this disclosure.

Disclosed are examples of a liquid diversion system for a welding device incorporating one or more geometric features in a cover, employing a hinge cover (e.g., a surface mounted bezel), and/or a liquid diverter behind the hinge cover. For example, the disclosed liquid diversion system employs covers having one or more sloped surface, a hinge cover with an indentation, and a liquid diverter with a sloped extension, each configured to divert flowing liquid away from the welding device.

Some conventional welder/generator systems equipped with external connections and receptacles risk a potential for water or other liquids to run down paneling surfaces (e.g., including user interfaces (UI)), seeping behind the often plastic front paneling surface, and down into the receptacle and/or other area housing system components (e.g., circuit breakers, electrical outlets, welding studs, compressed air outlets, data ports, etc.). Conventionally, a plastic bezel is fastened to the front paneling surface, resulting in a clamp between the bezel and paneling surface, which provides only modest protection from liquids. In particular, this clamp does not work consistently to prevent water ingress. For example, the clamping pressure decreases away from the point of fastening the bezel to the surface, such that edges of the bezel farthest from the point of fastening experience and increase in liquid ingress.

The disclosed liquid diversion system(s) reduce the likelihood of unintentional liquid ingress by incorporating one or more geometric features in a cover, employing a hinge cover (e.g., a surface mounted bezel), and/or a liquid diverter behind the hinge cover. By employing one or more of the above solutions, liquids running down the paneling surface is directed away from the welding device and away from the receptacles and/or other connections.

As provided herein, and as illustrated in the accompanying drawings, the cover(s) is shaped such that a top portion is sloped downward, away from the welding device. In response, the cover routes flowing liquid in front of a hinged pivot point, and thus mitigates or prevents water from entering the welding device. Further routing of the liquid flow can be achieved by mounting a liquid diverter (such as a sloped flap or extension, made of a flexible or semi-flexible material) to the front paneling surface prior to attaching the hinge cover to the paneling surface. The hinge cover is designed such that any liquid running down the face of the paneling surface is channeled beyond the pivot point of the cover hinge.

Advantageously, the disclosed liquid diversion system and the various features achieves liquid diversion while maintaining a low profile, generally concealed from normal viewing angles, thereby preventing unintentional impact. As a result, the likelihood of failure of electrical components is reduced, with features and components that are more compact than the alternatives, with a low profile, improved aesthetic, provided with a lower design and sourcing cost.

In disclosed examples, a liquid diversion system for a welding device includes a hinge having a sloping section and an indentation configured to channel liquid away from the welding device and over an external surface of the cover when in an open position; and a cover connected to the hinge and configured to direct liquid over a front surface of the cover and away from the welding device.

In some examples, the cover is configured to operate in one of the open position or a closed position, the open position providing access to a power receptacle, circuit breaker, or a system component.

In examples, the power receptacle is a welding-type receptacle configured to connect with a welding torch. In examples, the cover comprises a sloped top portion to direct liquid downward and away from the welding device.

In some examples, the system further includes a hinge guard configured to channel the liquid and to protect the hinge from external damage, wherein a pivot point of the hinge is arranged behind an end portion of a surface of the hinge guard.

In examples, the indentation is configured to allow the cover to extend beyond the hinge guard in the open position.

In some examples, the system further includes a liquid diverter comprising an overhang connected to the panel and configured to direct liquid over a front surface of the cover and away from the welding device.

In examples, the liquid diverter is configured as a retrofit device to be secured to a surface of a legacy welding-type device comprising one or more receptacle covers having an exposed hinge.

In examples, the liquid diverter is constructed of a material including one or more of a plastic or a metal. In examples, the welding device is one or more of a welding-type power supply or a welding wire feeder.

In some examples, the exposed surface comprises a front panel including one or more graphical user interfaces or physical switches.

In some disclosed examples, an enclosure panel for a welding device includes a surface panel comprising one or more apertures for one or more system components; a cover comprising a hinge having one or more sloping sections and an indentation configured to channel liquid away from the one or more apertures for the one or more system components; and a hinge guard configured to channel the liquid away from the one or more apertures for the one or more system components and to protect the hinge from external damage.

In some examples, the hinge guard comprises one or more openings configured to evacuate liquid from within the hinge guard over the hinge and away from the one or more apertures for the one or more system components.

In some examples, the hinge guard comprises a void configured to channel the liquid within the hinge guard toward the one or more openings.

In some examples, the one or more system components includes a circuit breaker, an electrical outlet, welding studs, a compressed air outlet, or a data port.

In some examples, an enclosure panel for a welding device includes an exposed surface panel comprising a one or more component apertures; a cover comprising a hinge having an inverted sloping section and an indentation configured to channel liquid away from the welding device and over an external surface of the receptacle cover; and a liquid diverter arranged on the exposed surface panel and above the cover and configured to direct the liquid over a surface of the receptacle cover and away from the one or more component apertures.

In some examples, the liquid diverter comprises an overhang connected to the panel and configured to direct liquid over a front surface of the receptacle cover and away from the one or more component apertures.

In some examples, the inverted sloping section includes two or more surfaces with different slope angles.

In some examples, the one or more system components includes a circuit breaker, an electrical outlet, welding studs, a compressed air outlet, or a data port.

In some examples, the enclosure panel further includes a hinge guard to house the liquid diverter and the hinge, the hinge guard configured to channel the liquid from the one or more component apertures.

As used herein, the terms "welding device," "welding-type device," "welding-type system" and/or "welding system," includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith, as well as auxiliary welding devices such as wire feeders.

As used herein, the term "hinge" includes any of numerous mechanical jointed and/or flexible devices about which a cover, door, lid, or other swinging portion turns, which further includes the movable parts of such a device.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

As used herein, the terms "first" and "second" may be used to enumerate different components or elements of the same type, and do not necessarily imply any particular order.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The term "power" is used throughout this specification for convenience, but also includes related measures such as energy, current, voltage, resistance, conductance, and enthalpy. For example, controlling "power" may involve controlling voltage, current, energy, resistance, conductance, and/or enthalpy, and/or controlling based on "power" may involve controlling based on voltage, current, energy, resistance, conductance, and/or enthalpy.

Turning to the drawings, FIG. 1A illustrates an enclosure panel 100 for a welding device, such as a welding-type power supply or a welding wire feeder, as a list of non-limiting examples. Although examples are provided with respect to welding devices and/or equipment, the disclosed concepts are applicable to a variety of devices and/or systems subjected to liquid that would benefit from the protections provided herein.

The panel 100 includes an exposed surface or panel 102, which may include one or more user interfaces 107 (e.g., one or more graphical user interfaces, physical switches, buttons, knobs, etc.). A cover 104 is provided with a hinge 108, which allows the receptacle cover to operate in a closed or an open position (as shown in FIG. 1A). In the open position, access to a power receptacle and/or other system components or external connections is provided to an operator.

In some examples, a hinge guard or protective bezel 106 is provided between the exposed surface 102 and the cover 104. The hinge guard 106 is configured to divert liquid away from the welding device and to protect the hinge 108 from external damage. For example, as liquid (such as rain) impacts the exposed surface 102, the liquid flows downward toward the cover 104. The hinge guard 106 provides a barrier to flowing liquid, such that liquid flows over the hinge guard 106 and away from the cover 104, and ultimately any receptacles, component, or external connection.

In some examples, any liquid that penetrates the interface 105 between the exposed surface 102 and the hinge guard 106 is further channeled away from the cover 104 (and covered receptacles, components, or external connections) by one or more of a liquid diverter and/or a hinge configured to channel liquids from the welding device.

Figure 1B:
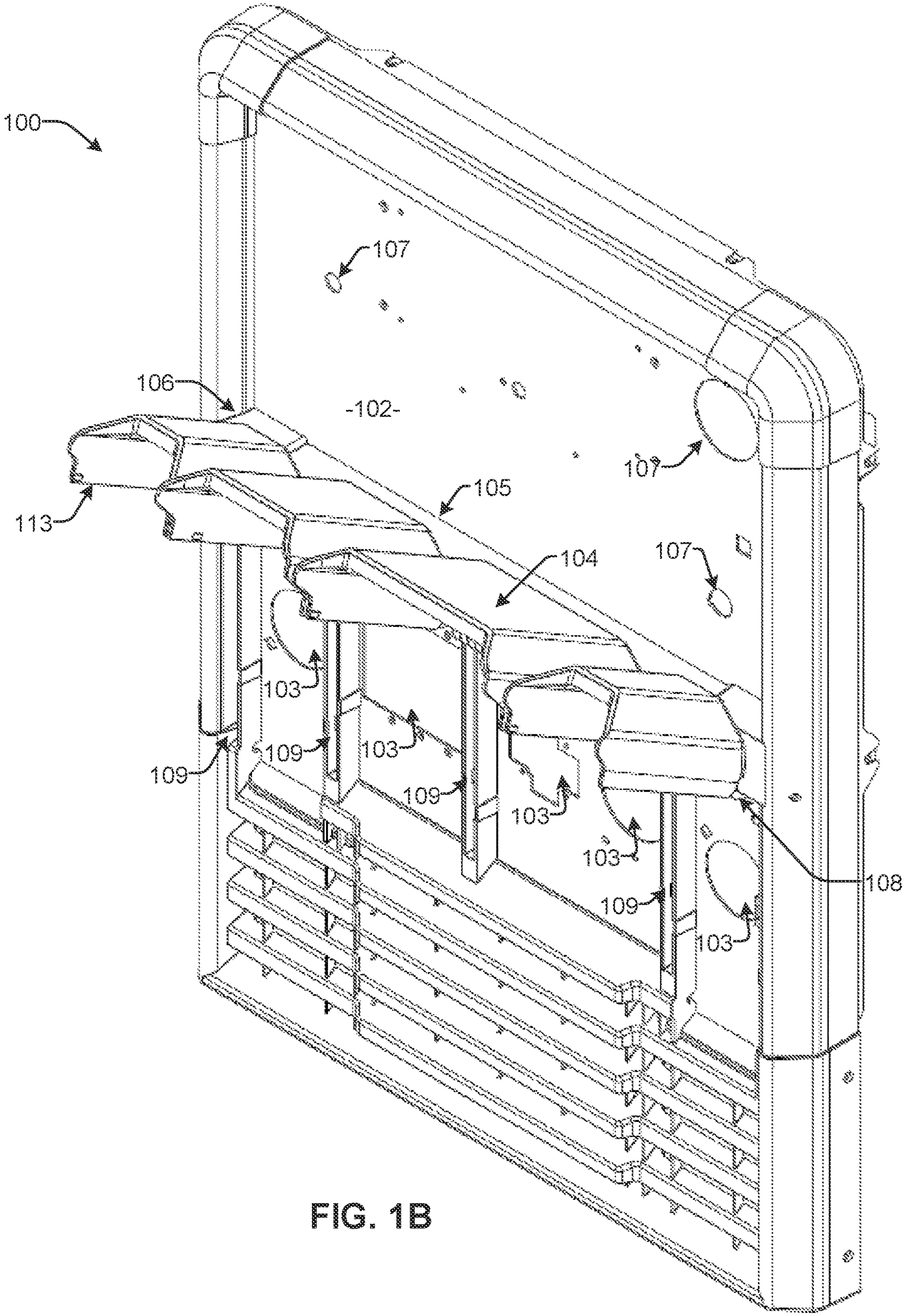
FIG. 1B illustrates a perspective view of an example enclosure panel employing a liquid diversion system with covers in an open position, in accordance with aspects of this disclosure.

FIG. 1B illustrates a perspective view of an example enclosure panel employing a liquid diversion system with covers in an open position. As shown, the covers 104 are configured to pivot on the hinge 108 to reveal one or more component apertures 103 in the panel 100. As disclosed herein, the shape of the hinge includes an indentation that directs liquid away from the panel/welding system, in both closed and open positions. As illustrated below with respect to FIG. 2D, any liquid that flows over the hinge will be diverted (e.g., laterally) by the indentation in the open position, rather than flowing back upwards and toward the plane that includes the exposed surface 102, and therefor to the receptacle, component, or external connection.

In some examples, channels 109 are arranged between covers 104. As shown in FIG. 1B, the channels 109 are substantially vertical and extend from a surface of the enclosure panel. The channels 109 are configured to accept one or more edges 113 of covers 104. In this manner, liquid flowing over the covers 104 (e.g., to the side and down around the covers 104) is directed away from the apertures 103.

Figure 2A:
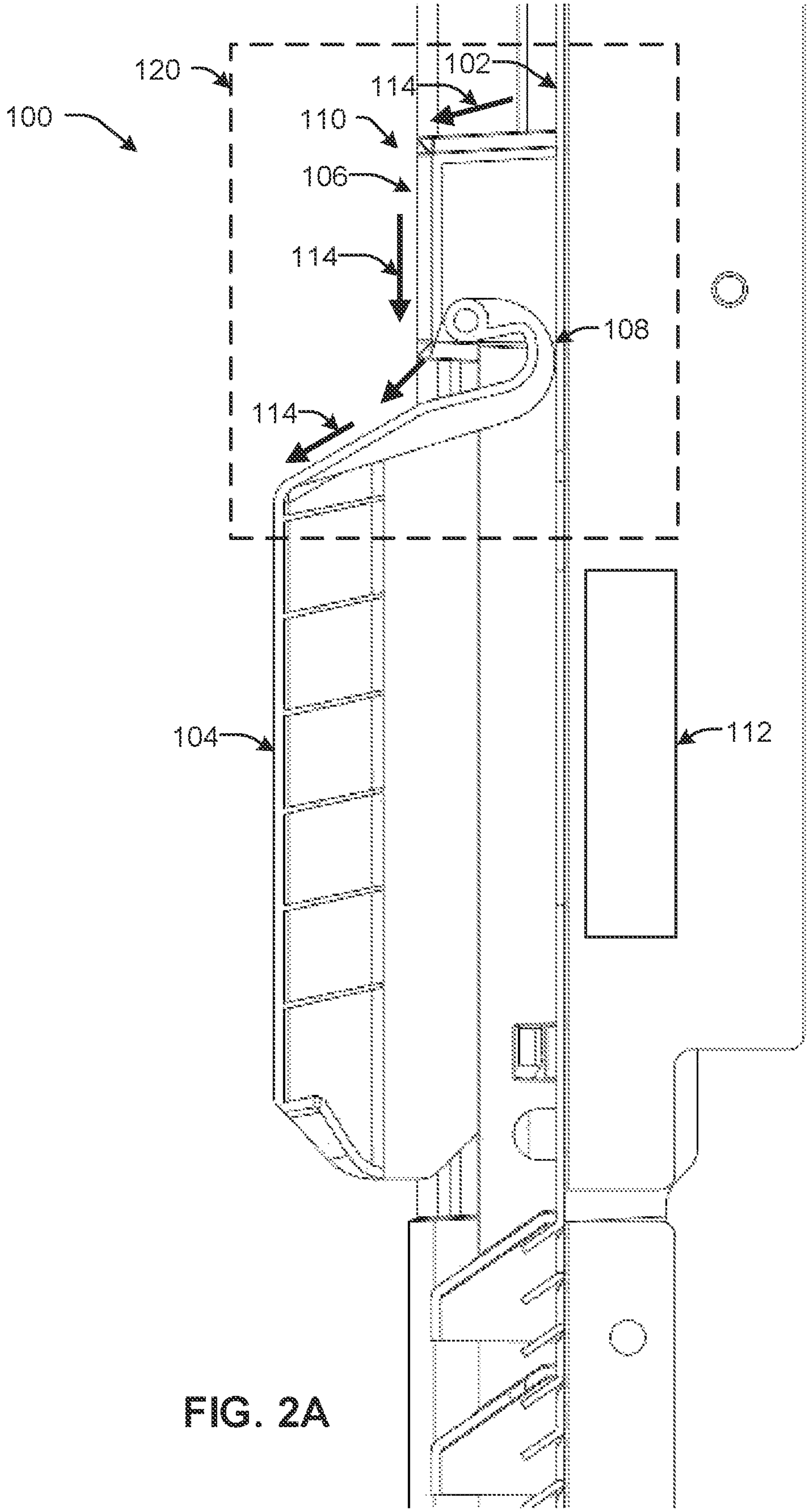
FIG. 2A illustrates a cut-away side view of the example enclosure panel employing the liquid diversion system of FIG. 1A, in accordance with aspects of this disclosure.

FIG. 2A illustrates a cut-away side view of a portion of the enclosure panel 100. As shown, the enclosure panel 100 includes one or more of a hinge and/or a hinge guard 106. The exposed surface 102 is subjected to a liquid 114. As shown, the liquid 114 is diverted by hinge guard 106 of a liquid diversion system 110, thereby causing the liquid 114 to flow over the hinge guard 106 and the cover 104. The configuration of hinge 108 ensures liquid 114 does not splash toward system components 112, as described in greater detail below.

Figure 2B:
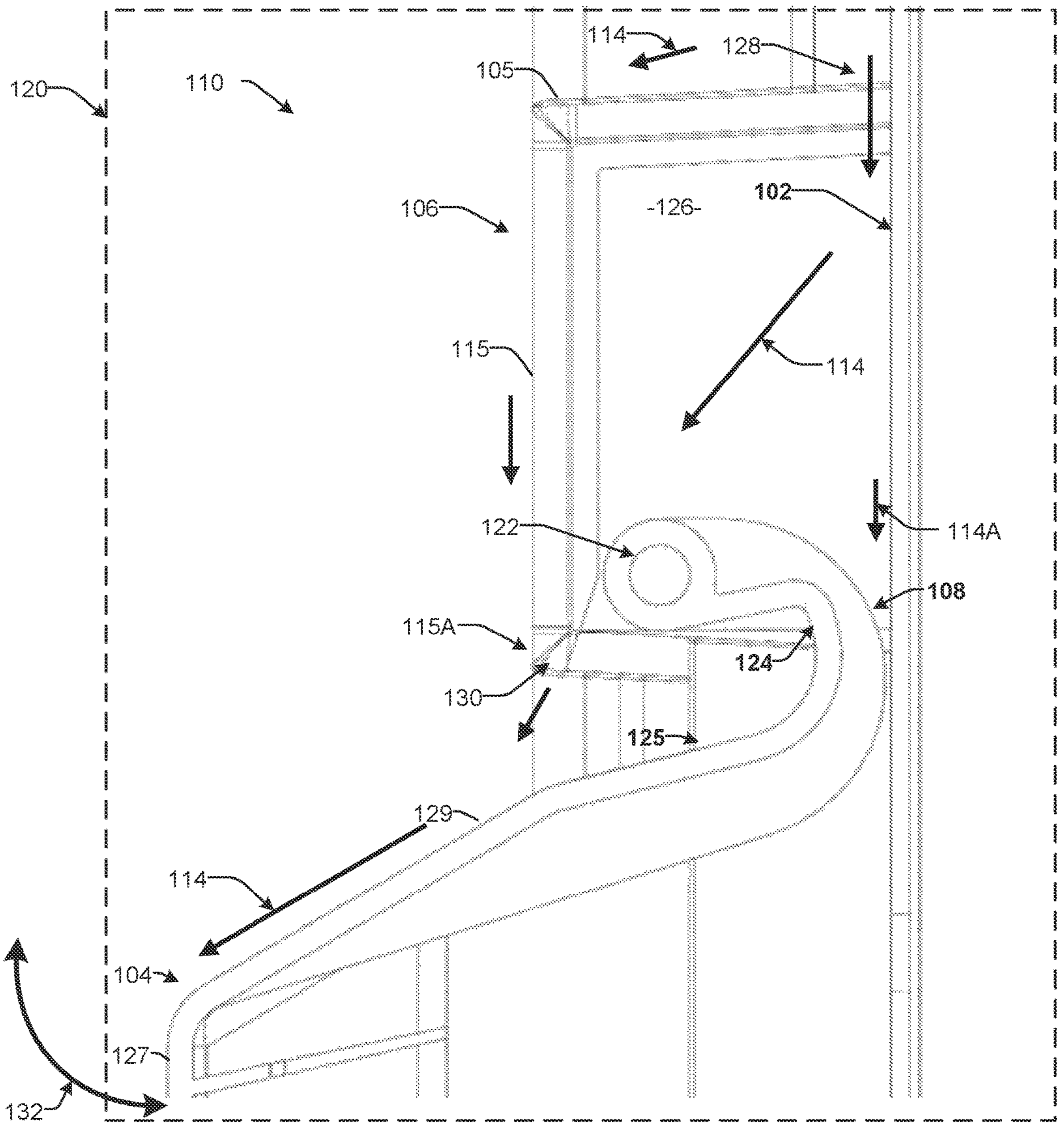
FIG. 2B illustrates a detailed cut-away side view of the example enclosure panel employing the liquid diversion system of FIG. 2A, in accordance with aspects of this disclosure.

FIG. 2B provides a detailed cut-away side view of section 120, illustrating detail of a hinge pin 122, the hinge guard 106, and the liquid diversion system 110. As shown, the receptacle cover 104 is configured to operate in one of an open or a closed position, pivotable in direction 132 about the hinge pin 122. In the closed position, the receptacle cover 104 is substantially flush against the exposed surface 102, concealing and protecting the receptacle 112. In the open position, the receptacle cover 104 rotates in direction 132 about hinge pin 122, providing access to the receptacle 112. As shown, the hinge pin 122 (e.g., the pivot point for the cover 104) is arranged within the hinge guard 106 at a position above an end portion 115A of hinge guard surface 115. Whether in a closed or open position, the hinge pin 122 is substantially covered by the hinge guard 106, thereby preventing liquid from reaching inside of the cover 104.

The receptacle cover 104 is movable about the hinge pin 122, connected to the cover via a portion 125 defined by an inverted slope terminating at an indentation 124. For example, the slope directs liquid away from the welding device in both the closed and open positions. The indentation 124 is constructed to extend beyond the hinge guard in the open position, as well as prevent liquid from flowing downward and toward the receptacle 112 in the open position. For instance, at least a portion of the liquid that flows over the hinge pin 122 will be diverted (e.g., laterally) by the indentation 124 in the open position, rather than flowing back upwards and toward the plane that includes the exposed surface 102, and therefor to the receptacle 112.

In some examples, the hinge guard 106 is mounted to the enclosure panel 100 and configured to channel the liquid 114 away from the welding device and to protect the hinge pin 122 from external damage. In some examples, the hinge guard 106 is constructed to enclose the hinge pin 122, and can be formed as a substantially rectangular channel (see, for example, FIGS. 1 and 3). The top surface 105 of the hinge guard 106 can be secured to or otherwise connect with the exposed surface 102, thereby channeling liquid 114 over the hinge guard 106 and down a front surface 127, away from the welding device (and the receptacle 112, arranged below the guard).

In conventional receptacle covers, a liquid would be drawn down by gravity and follow any exposed surface (when oriented vertically or substantially vertically), allowing liquid to seep between any hinge and the surface, thereby exposing a receptacle to the liquid and any resulting damage.

By employing the disclosed hinge and/or hinge guard 106 liquid 114 is channeled away from the welding device, preventing some or all liquid 114 from reaching the receptacle 112 and/or any cord or wire connected to the receptacle 112. As a result, issues stemming from liquid damage can be mitigated or avoided, improving the functioning and extending the life of the welding device.

In some examples, an interface between the hinge guard 105 and the exposed surface 102 is substantially liquid-tight. In some examples, an amount of liquid may seep into the hinge guard 105 by an opening 128 (e.g., a purposeful or unintentional opening). The flow of the liquid 114 within the hinge guard 106 can be directed through an internal channel or void 126, such that a portion of the liquid 114 flows over the hinge pin 122 and out an opening 130 (e.g., at end surface 115A). Some liquid 114 is then directed over a top portion 129 of the receptacle cover 104 and away from the welding device.

In some examples, as shown in FIG. 2B, some liquid 114A may flow between the hinge 108 and a surface of the panel, such as within the hinge guard 106. This may allow some fluid to drip into the aperture 109, which may impact the system components therein.

Figure 2C:
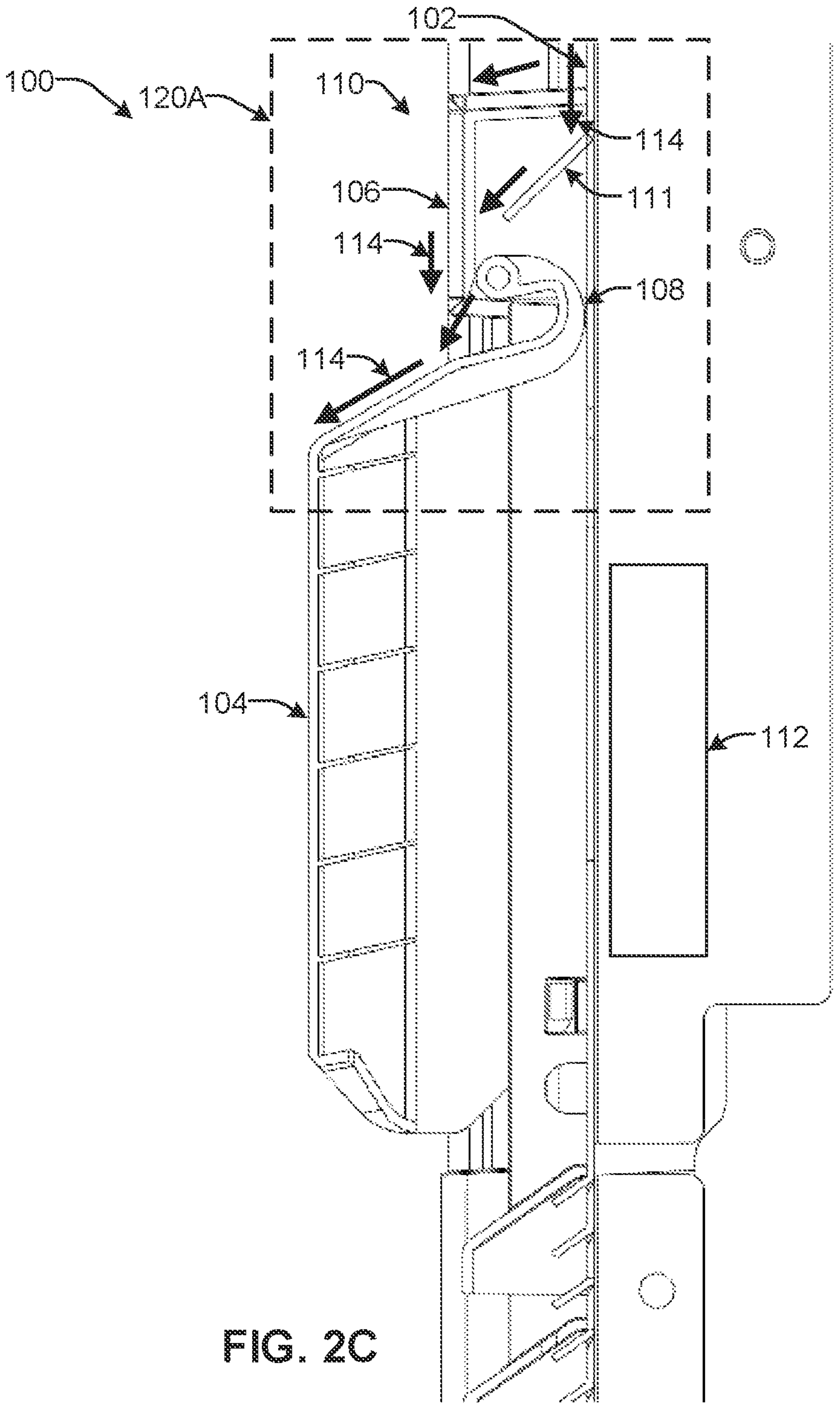
FIG. 2C illustrates a cut-away side view of the example enclosure panel employing another liquid diversion system, in accordance with aspects of this disclosure.

FIG. 2C illustrates a cut-away side view of a portion of the enclosure panel 100. As shown, FIG. 2C shows a panel is similar to the enclosure panel 100 provided in FIG. 2A. However, an example liquid diverter 111 is provided. The liquid 114 may flow downward on the exposed surface 102 toward a receptacle 112 (e.g., a power receptacle, an auxiliary receptacle, a communications interface, studs to connect with a welding torch, etc.). In order to protect the receptacle 112 from liquid, a liquid diversion system 110 including one or more of a hinge, a hinge guard 106, and/or the liquid diverter 111 may be employed to channel the liquid 114 away from the welding device.

Figure 2D:
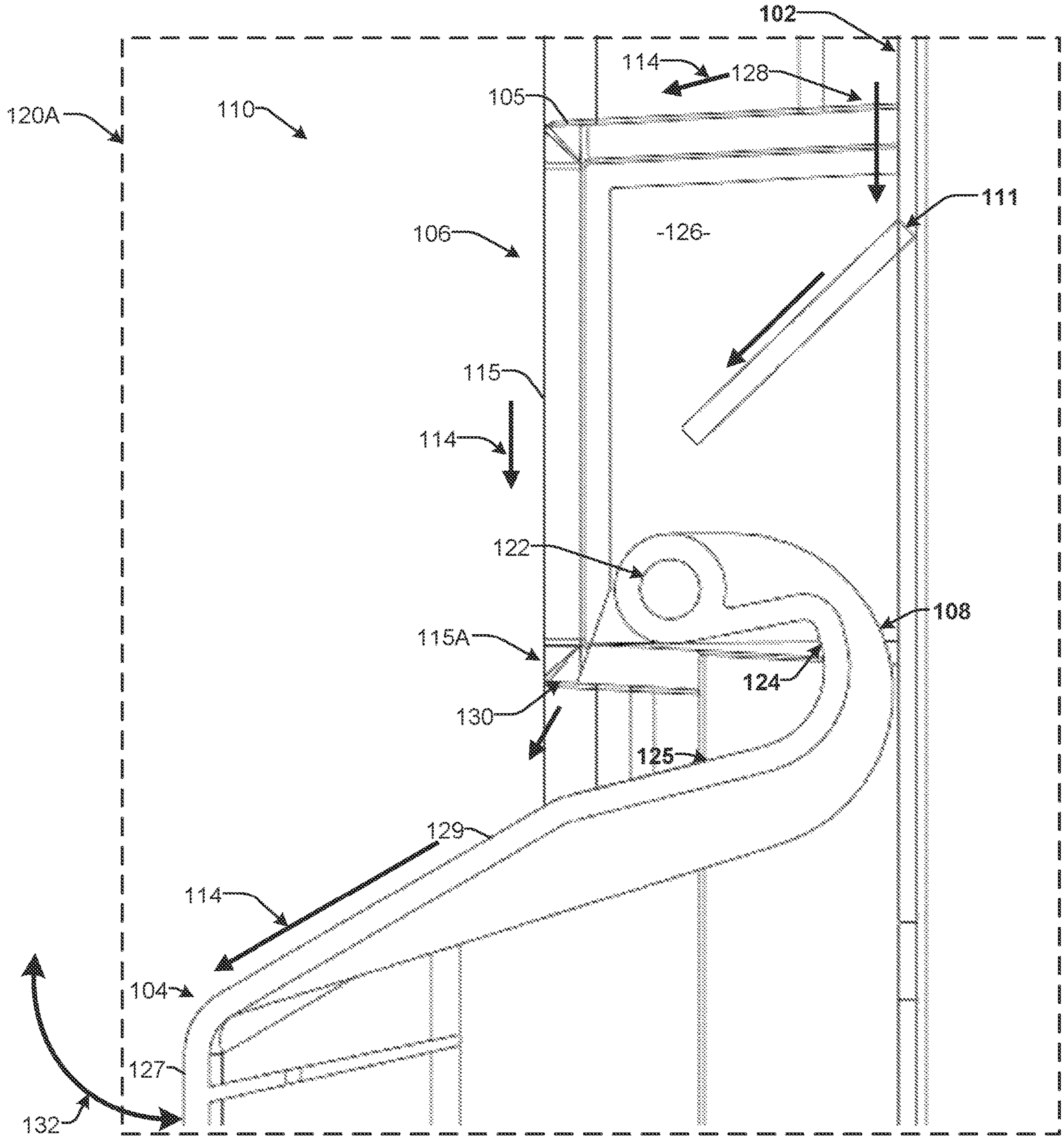
FIG. 2D illustrates a detailed cut-away side view of the example enclosure panel employing the liquid diversion system of FIG. 2C, in accordance with aspects of this disclosure.

FIG. 2D provides a detailed cut-away side view of section 120A, illustrating detail of a hinge pin 122, the hinge guard 106, and the liquid diversion system 110. As shown, the receptacle cover 104 is configured to operate in one of an open or a closed position, pivotable in direction 132 about hinge pin 122. In the closed position, the receptacle cover 104 is substantially flush against the exposed surface 102, concealing and protecting the receptacle 112. In the open position, the receptacle cover 104 rotates in direction 132 about hinge pin 122, providing access to the receptacle 112.

In some examples shown in FIGS. 2C and 2D, the liquid diverter 111 can be arranged on the exposed surface 102, and employed separately from or together with the hinge pin 122 and/or the hinge guard 106. The liquid diverter 111 can include or be configured as an extension or overhang arranged to direct the liquid 114 over the hinge pin 122, the top (often slanted) surface 129, and/or over the front (often vertical) surface 127 of the receptacle cover 104. In some examples, the surface 125 has an angle relative to the front surface 127 that is different from the angle of the top surface 129.

In some examples, the liquid diverter 111 is a flap or strip designed to mount to the exposed surface 102 at a first, upper portion, with a second, lower portion extending from the exposed surface 102. The first portion may be secured to the exposed surface 102 by an adhesive or other fixture, and may or may not create a liquid-tight seal against the surface. In some examples, the liquid diverter 111 is formed of a substantially rigid material (e.g., metal, a hard polymer, etc.), fixing the slope and/or orientation of the diverter 111 relative to the exposed surface 102. In some examples, the liquid diverter 11 is formed of a flexible material (e.g., rubber, a soft polymer, etc.).

Figure 2E:
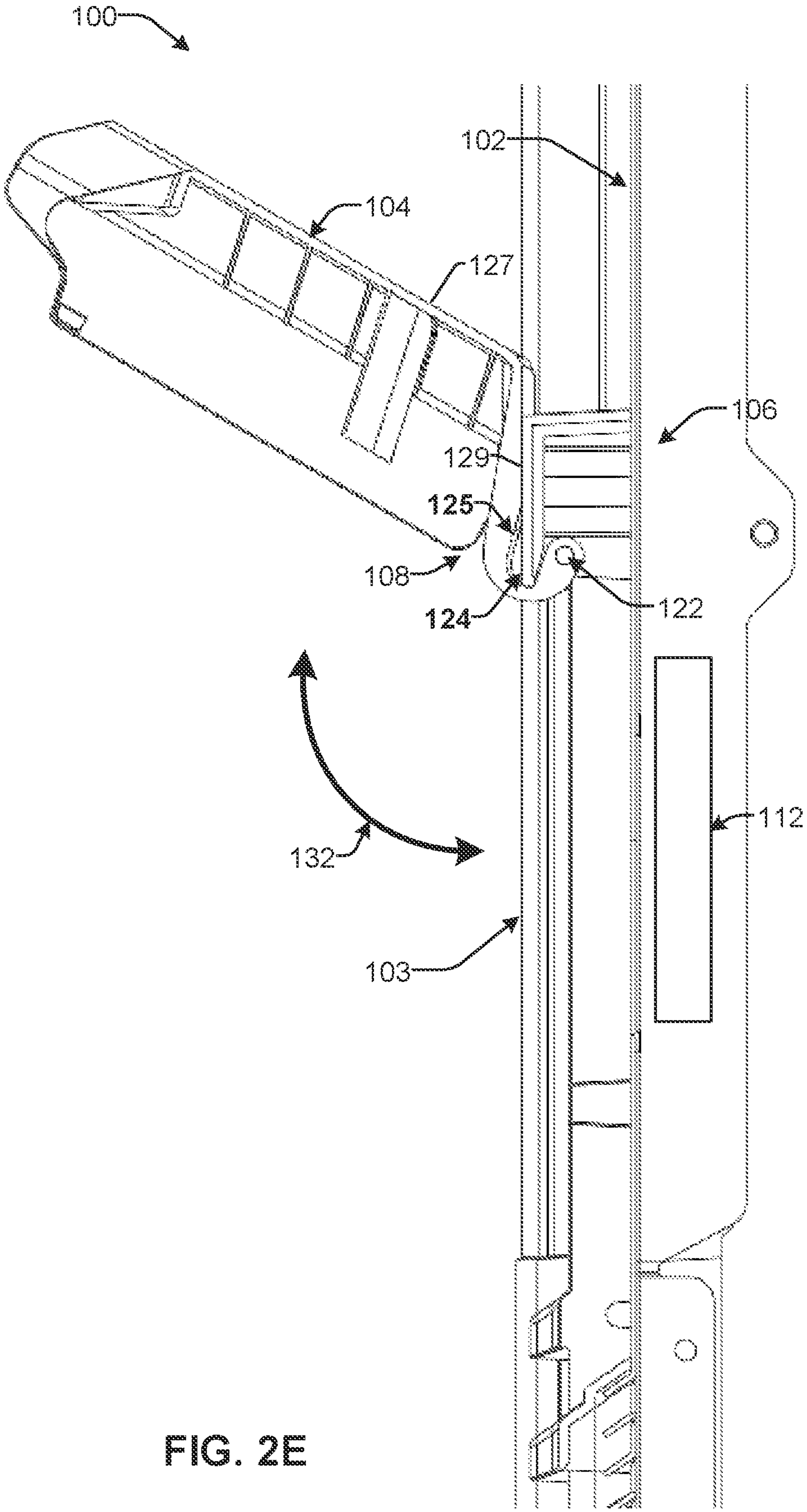
FIG. 2E illustrates a cut-away side view of an example enclosure panel with covers in an open position, in accordance with aspects of this disclosure.

FIG. 2E illustrates a cut-away side view of the example enclosure panel with covers 104 in an open position. As shown, in the open position the indentation 124 creates a channel to laterally move any water that flows down the face of the enclosure. This reveals the component opening 103 and thereby the receptacle 112 behind.

Although in some illustrated examples a liquid diverter 111, a hinge cover 106, and a receptacle cover 104 having a surface 125 with an inverted slope and an indentation 124 are all employed with the enclosure panel 100, in some examples one or more of the liquid diverter 111, the hinge cover 106, or the receptacle cover 104, or any combination thereof, may be employed to channel liquid from the welding device.

Although illustrated as substantially rectangular in shape, the hinge guard 106 may present any of a variety of shapes and/or geometries (e.g., trapezoidal, curved, etc.), or a combination of shapes and/or geometries.

Figure 3:
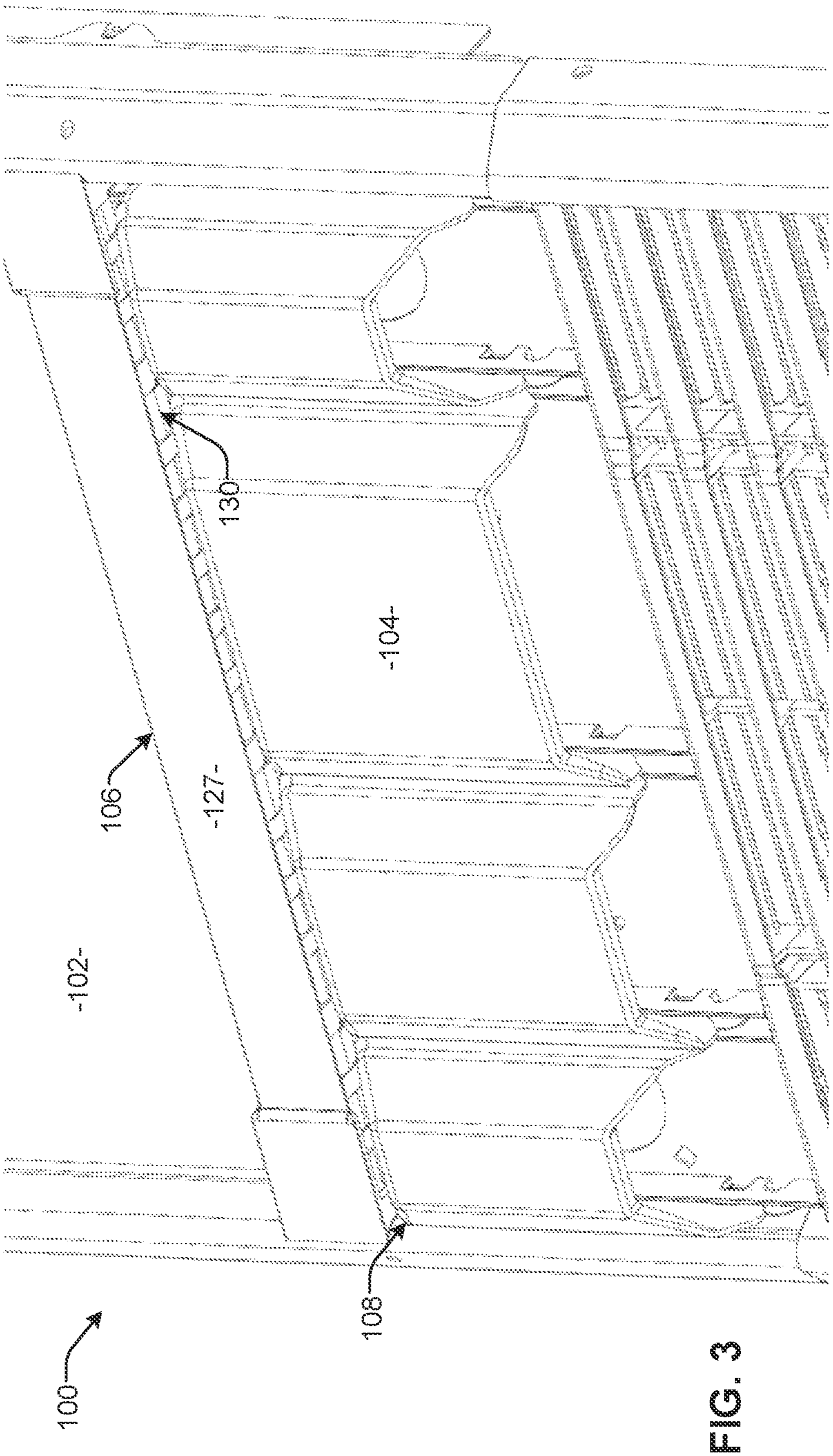
FIG. 3 illustrates another perspective view of the example enclosure panel employing a liquid diversion system of FIG. 1A, in accordance with aspects of this disclosure.

FIG. 3 illustrates a lower perspective view of the hinge guard 106 relative to the exposed surface 102 and the receptacle cover 104. As shown, one or more openings 130 are arranged proximate the front surface 127 of the hinge guard 106, with the hinge 108 arranged between the openings 130 and the exposed surface 102.

In some examples, one or more of the liquid diverter 111, the hinge cover 106, or the receptacle cover 104, or any combination thereof, may be configured as a retrofit device, and may be secured to the exposed surface of a legacy welding-type device with one or more receptacle covers (e.g., with an exposed hinge).

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, "and/or" means any one or more of the items in the list joined by "and/or". As an example, "x and/or y" means any element of the three-element set {(*x*), (*y*), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An enclosure panel for a welding device comprising:
a surface panel comprising one or more apertures for one or more system components;
a cover comprising:
a hinge;
one or more sloping sections; and an indentation configured to channel liquid away from the one or more apertures for the one or more system components, wherein the one or more sloping sections of the cover comprise an inverted sloping section directed upwards and inwards from the hinge when the cover is in a closed position, the one or more sloping sections configured to direct liquid away from the one or more apertures when the cover is in both the closed position and an open position; and a hinge guard configured to channel the liquid away from the one or more apertures for the one or more system components and to protect the hinge from external damage.

2. The enclosure panel of claim 1, wherein the hinge guard comprises one or more openings configured to evacuate liquid from within the hinge guard over the hinge and away from the one or more apertures for the one or more system components.

3. The enclosure panel of claim 1, wherein the hinge guard comprises a void configured to channel the liquid within the hinge guard toward the one or more openings.

4. The enclosure panel of claim 1, wherein the one or more system components includes a circuit breaker, an electrical outlet, welding studs, a compressed air outlets, or a data port.

5. An enclosure panel for a welding device comprising:

an exposed surface panel comprising one or more component apertures;

a cover comprising:

a hinge;

an inverted sloping section; and an indentation configured to channel liquid away from the welding device and over an external surface of the cover, wherein inverted sloping section is directed upwards and inwards from the hinge when the cover is in a closed position, the inverted sloping section configured to direct liquid away from the one or more apertures when the cover is in both the closed position and an open position; and a liquid diverter arranged on the exposed surface panel and above the cover and configured to direct the liquid over the hinge and a surface of the cover and away from the one or more component apertures.

6. The enclosure panel of claim 5, wherein the liquid diverter comprises an overhang connected to the panel and configured to direct liquid over a front surface of the cover and away from the one or more component apertures.

7. The enclosure panel of claim 5, wherein the inverted sloping section includes two or more surfaces with different slope angles.

8. The enclosure panel of claim 5, wherein the one or more system components includes a circuit breaker, an electrical outlet, welding studs, a compressed air outlets, or a data port.

9. The enclosure panel of claim 5, further comprising a hinge guard to house the liquid diverter and the hinge, the hinge guard configured to channel the liquid from the one or more component apertures.

10. The enclosure panel of claim 5, wherein the inverted sloping section extends beyond the hinge guard in the open position.

* * * * *